E. H. De Witt,
Circular Saw Mill,
No 19,005.
Patented Dec. 29, 1857.
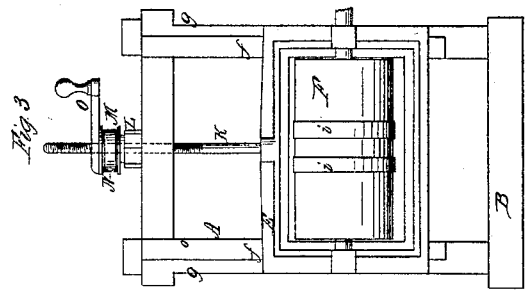
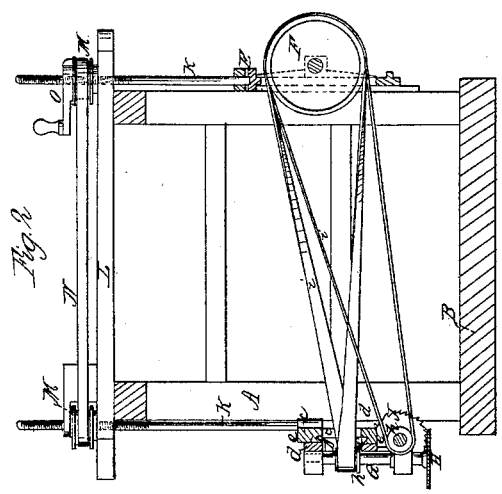
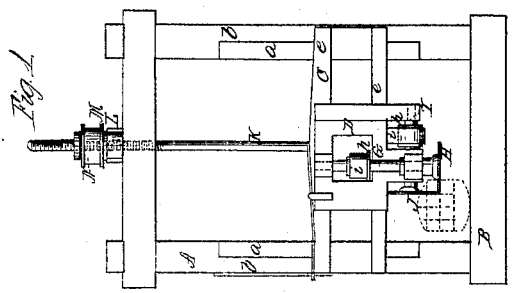

UNITED STATES PATENT OFFICE.

E. H. DE WITT, OF XENIA, OHIO, ASSIGNOR TO HIMSELF AND BUTLER N. STRONG, OF SAME PLACE.

CIRCULAR SAWING-MACHINE.

Specification of Letters Patent No. 19,005, dated December 29, 1857.

*To all whom it may concern:*

Be it known that I, E. H. DE WITT, of Xenia, in the county of Greene and State of Ohio, have invented a new and Improved Sawing-Machine; and I do hereby declare that the following is a full, clear, and exact description of the same, reference being had to the annexed drawings, making a part of this specification, in which—

Figure 1 is a front view of my improvement. Fig. 2 is a longitudinal vertical section of ditto, the plane of section passing through the center. Fig. 3 is a back view of ditto.

Similar letters of reference indicate corresponding parts in the several figures.

This invention relates to a new and improved machine for sawing both vertically and laterally at the same time, so that rectangular pieces of timber, laths or strips for various purposes can be sawed direct from the log, or, large timber re-sawed into small pieces of the desired form.

The invention consists in the employment or use of two circular saws, one being placed vertically and the other horizontally, in a frame which is capable of being adjusted both vertically and laterally while the saws are in motion and both saws driven from the same power shaft or drum.

To enable those skilled in the art to make and use my invention, I will proceed to describe its construction and operation.

A represents a rectangular framing placed on a suitable base B, and C represents a frame which is placed at the front end of the framing A and allowed to slide freely up and down on guides (*a*) (*a*) attached to the front uprights (*b*) (*b*), see Fig. 1.

In the frame C a small frame D is placed, the frame D is of rectangular form and its upper and lower ends have dovetail projections (*c*) (*c*) formed on it, which projections fit in corresponding shaped grooves (*d*) (*d*) in the upper and lower rails (*e*) (*e*) of the frame C, see Fig. 2. The frame D is allowed to slide freely back and forth within the frame C.

To the back part of the framing A a frame E is placed. This frame E is allowed to slide freely up and down on guides (*f*) (*f*) on the back upright (*g*) (*g*) of the framing; within the frame E a drum F is placed.

In the frame D a vertical arbor G is placed said arbor having a circular saw H on its lower end, and a horizontal arbor I is placed at the bottom end of the frame D, said arbor having a vertical saw J on its end; the cutting edge of the vertical saw J extends down so as to meet the plane in which the horizontal saw H is placed.

To each frame C, E a vertical screw rod K is attached. These screw rods pass up through the ends of a longitudinal bar L, which is secured on the upper part of the framing A and a circular nut M is fitted on each screw rod, said nuts having pulleys around which a belt N passes. To one of the nuts M a crank O is attached.

Each of the saw arbors G, I, has a pulley (*h*) on it and around these pulleys, belts (*i*) pass, said belts also passing around the drum F.

From the above description of parts it will be seen that by turning the crank O, the two frames C, E, will be raised and lowered simultaneously, and the saws therefore may be adjusted without stopping the drum which is connected with the power shaft. It will also be seen that the saws may be adjusted laterally by moving the frame D in the frame C. The saws therefore may be adjusted or set to the log or timber as circumstances may require without stopping the power shaft and the motion of the saws.

The frame D has an index (*j*) attached to its upper end, said index projecting over a graduated plate (*k*) which is attached to the upper cross rail (*e*) of frame C. An index (*l*) is also attached to one end of the frame C, said index projecting over a graduated plate (*m*) on one of the uprights (*b*).

By this invention a ready mode of adjusting or setting the saws to the log is obtained, and the time which in other machines is expended in throwing the power shaft in and out of gear in order to stop the saws while being adjusted or set is saved by this improvement.

I am aware that vertical and horizontal saws have been previously used, and also a combination of reciprocating and vertical saws have been used for the purpose herein described. I therefore do not claim the employment of a horizontal and vertical circular saw separately or irrespective of their arrangement as herein shown, but—

Having thus described my invention what

I claim as new and desire to secure by Letters Patent is,

The construction of sawing machines in the manner herein described, viz., having one of the circular saws J arranged vertically, and the other circular saw H arranged horizontally, both saws cutting simultaneously and being carried in adjustable frames C, D, all as set forth for the purposes specified.

E. H. DE WITT.

Witnesses:
D. B. TIFFANY,
D. MILLEN.